April 1, 1952  A. MUSSCHOOT  2,591,281
MOUNT FOR OSCILLATING MATERIALS HANDLING EQUIPMENT
Filed Jan. 19, 1948  3 Sheets-Sheet 1

Inventor
Albert Musschoot
By
Attorney

April 1, 1952  A. MUSSCHOOT  2,591,281
MOUNT FOR OSCILLATING MATERIALS HANDLING EQUIPMENT
Filed Jan. 19, 1948  3 Sheets-Sheet 2

Inventor
Albert Musschoot
By
Attorney

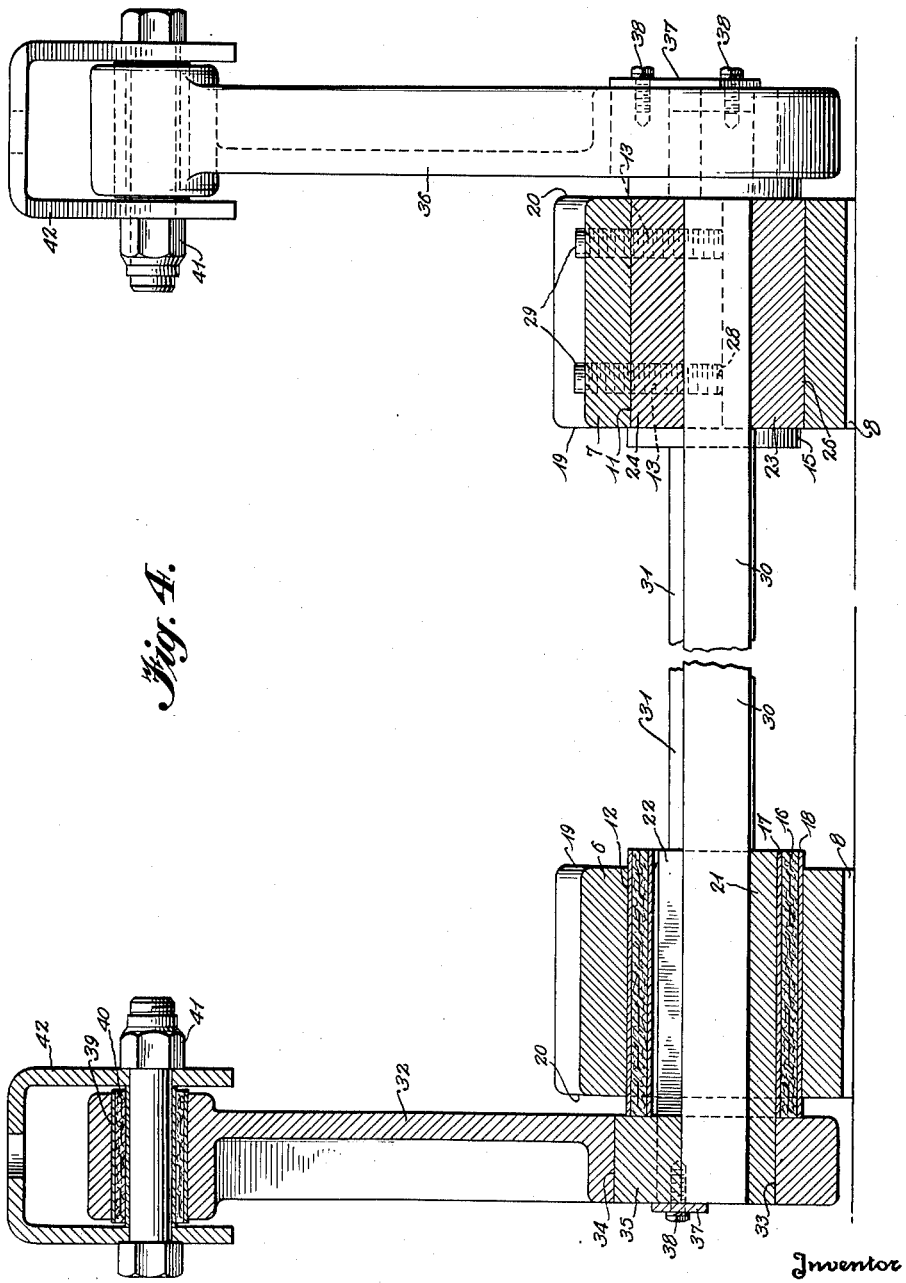

Patented Apr. 1, 1952

2,591,281

UNITED STATES PATENT OFFICE 2,591,281

MOUNT FOR OSCILLATING MATERIALS HANDLING EQUIPMENT

Albert Musschoot, Chicago, Ill., assignor to Link-Belt Company, a corporation of Illinois Application January 19, 1948, Serial No. 3,075

18 Claims. (Cl. 267—1)

This invention relates to new and useful improvements in mounting apparatus for materials handling equipment such as, for example, oscillating conveyors, feeders, screens, and the like, and deals more particularly with the association of reactor elements with the arms employed for supporting the oscillating bodies of such materials handling equipment.

It has been found in present practice that the frequency of vibration desirable in materials handling equipment of the oscillating type is such that the shock of overcoming the inertia forces of the oscillating body is too great for the driving unit to withstand in any but the relatively small capacity units.

This difficulty has led to the installation of resilient supporting means and reactor elements with satisfactory results, but with the attendant expense of more complicated apparatus and difficulty in installation and replacement of parts, particularly where short strokes are employed.

Another problem is the balancing of forces among the several supporting members. This problem is particularly difficult when it is desirable to prestress the supporting members and thus reduce the possibility of fatigue failure by avoiding a reversal of stresses in the supporting members during operation.

It is the primary object of this invention to provide mounting means for oscillating, materials handling equipment such as, for example, conveyors, feeders, screens, and the like, said means to incorporate resiliency, and reactor elements in one simple structure.

Another important object of this invention is to provide for the elimination of many of the problems inherent in the assembly and disassembly of mounting means of the above mentioned type.

A further object of this invention is to provide means for the balancing of forces among the several supporting members, and simultaneously prestressing the supporting device within a safe limit imposed by the nature of the device by adjustable means to a point where there is no stress reversal during operation of the materials handling equipment. This prestressed condition also permits the mounting means to act as reactor springs in absorbing the energy of the oscillating body at each end point of the oscillations.

A further object of the invention is to provide spring reaction and adjustment over a relatively wide range of supporting arm angles as required by the nature of the material handled and the conveying action desired.

Other objects and advantages of the invention will be apparent during the course of the following description.

In the accompanying drawings forming a part of this specification and in which like numerals are employed to designate like parts throughout the same, Figure 1 is a plan view of the oscillating mounts, Figure 2 is a side elevational view of the said oscillating mounts, Figure 3 is an end elevational view of the oscillating mounts, partly broken away to show an operative arrangement between one torsion bar and its end clamp.

Figure 4 is a vertical sectional view on the line 4—4 of Fig. 3, and

Figure 1:
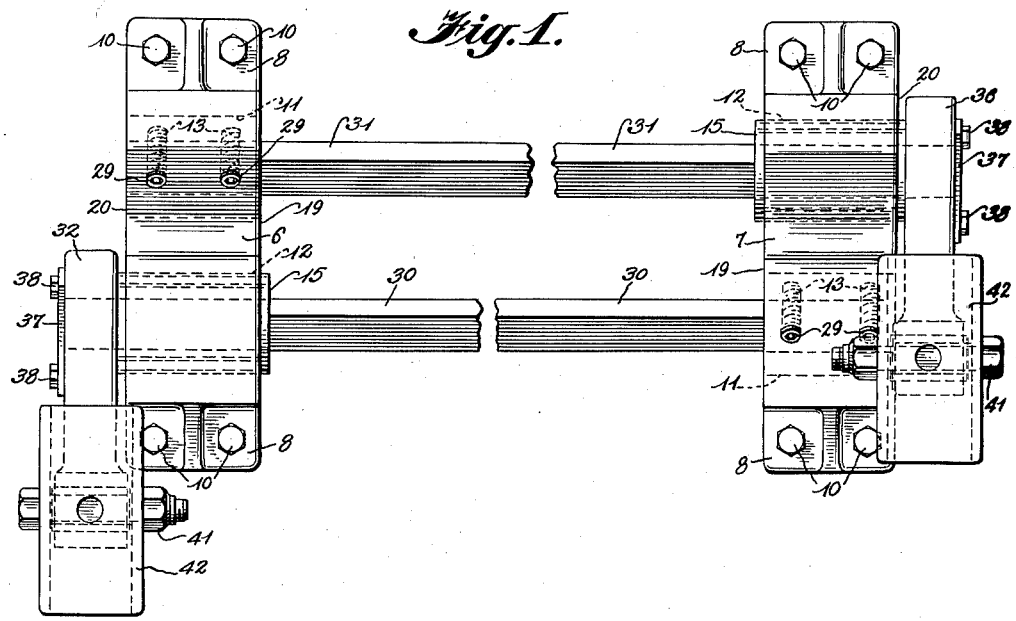
Figure 2:
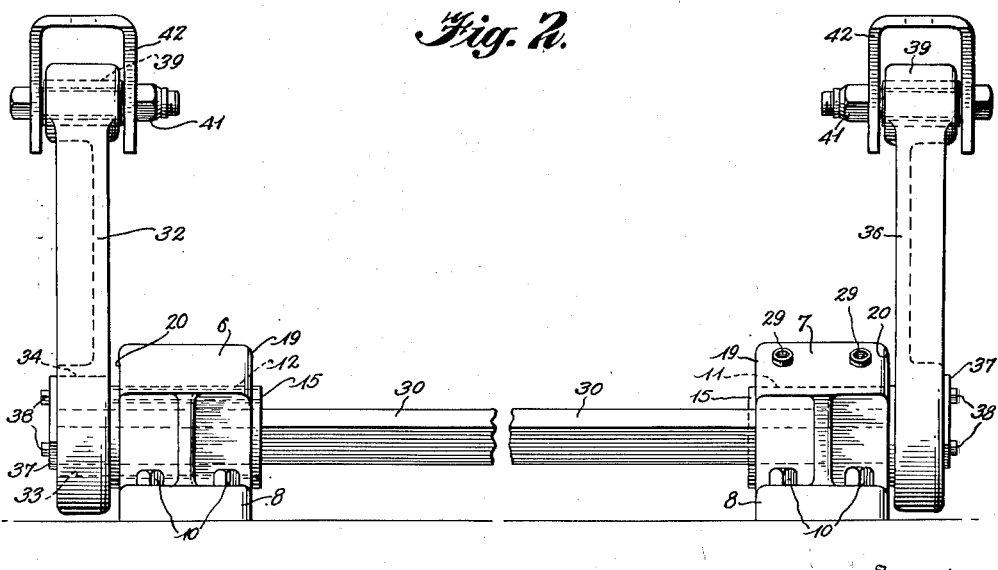

In the drawings, wherein for the purpose of illustration are shown preferred embodiments of the invention, and first particularly referring to Figs. 1 to 4, inclusive, reference characters 6 and 7 designate a pair of identical housings. The following description of the housing 6 and its associated members is equally descriptive of the other housing 7 and its similarly associated members, and the same reference characters will be used to designate corresponding parts or portions of each. As is shown in Fig. 1, there is an end for end reversal in the location of those members associated with the housings 6 and 7.

The housing 6 is provided with a suitable base 8 having openings 9 for receiving bolts 10 or the like for connection to a supporting floor. Two axially parallel cylindrical openings 11 and 12 extend laterally through the housing 6, and in those cases where it is desirable the openings 11 and 12 may be made of the same diameter, as is shown in the drawings.

Tapped holes 13 extend from the upper surface 14 of the housing 6 to their associated opening 11. The location of the tapped holes 13 with relation to the opening 11 will be further explained in a later paragraph.

The opening 12 supports in a tightly fitted relationship a tubular bushing 15 composed of a central rubber member 16 having a steel lining 17 and a steel backing 18. The bushing 15 extends slightly beyond the inner face 19 and the outer face 20 of the housing 6.

The bushing 15 in turn supports in fitted relation thereto a cylindrically shaped adapter member 21 provided with a channel 22 that is rectangular in cross section and coextensive with the length of the member 21. The adapter member 21 extends through the bushing 15 from its inner extremity to a point some distance beyond its outer extremity.

The opening 11 contains in loose relationship clamping shoes 23 and 24 and a spacer 25. Each of the above mentioned members 23, 24 and 25 are of the same axial length as the opening 11. The clamping shoes 23 and 24 are provided with curved outer surfaces 26 and 27 respectively to conform with the surface of the opening 11, and the spacer 25 is square in cross section. The positioning of the two clamping shoes 23 and 24 and the spacer 25 is such that an opening is provided axially of the opening 11 when the surfaces 26 and 27 lie along the surface of the opening 11 and the spacer 25 is between adjacent side portions of the clamping shoes 23 and 24. The clamping shoe 23 provides a surface 28 that is approximately normal to the tapped holes 13.

Set screws 29 or the like are threaded into the tapped holes 13 to contact the surface 28 of the clamping shoe 23.

The two housings 6 and 7 are so positioned that the opening 11 of each is in axial alignment with the opening 12 of the other.

A torsion bar 30, square in cross section, has one of its end portions fitted loosely into the opening provided by the clamping shoes 23 and 24 and the spacer 25 of the housing 7, and extends through the channel 22 axially of the opening 12 in the housing 6 to the outer end of the adapter member 21. Another torsion bar 31 is similarly positioned with respect to the clamping shoes 23 and 24 and the spacer 25 of housing 6 and the channel 22 associated with housing 7.

A supporting arm 32, having an opening 33 through one of its end portions provided with the keyway 34, is positioned over the portion of the adapter member 21 protruding from the outer face 20 of the housing 6. Key 35 is positioned in the keyway 34 and a portion of the channel 22 to rigidly connect the torsion bar 30, adapter member 21, and supporting arm 32.

A similar supporting arm 36 is correspondingly connected to torsion bar 31 and its associated adapter member 21 at the housing 7. The desired distance between the supporting arms 32 and 36 will determine the length of the torsion bars 30 and 31 and the distance between the housings 6 and 7.

A keeper plate 37 is held in place across the outer surface of key 35 by studs 38 or the like to prevent axial movement of the key 35.

The opposite end of each of the supporting arms 32 and 36 is provided with an opening 39 mounting a tubular bushing 40 of the type heretofore described. The bushing 40 in turn mounts a nut and bolt 41 to support the inverted channel iron 42 for connection to the body to be supported.

Figure 5:
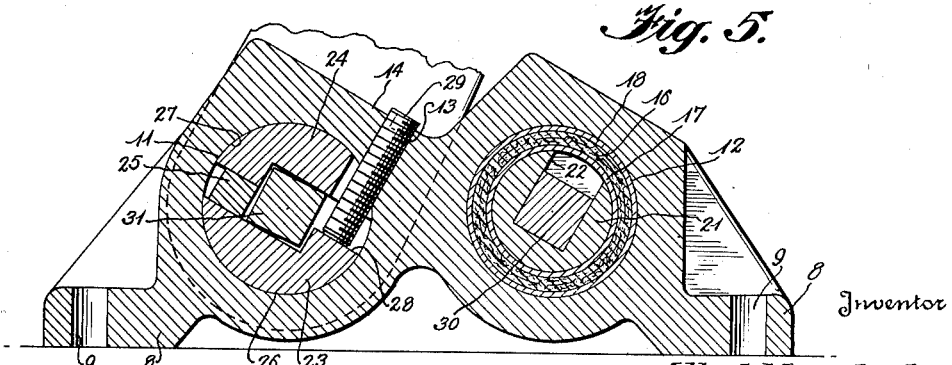
Figure 5 is a fragmentary vertical sectional view illustrating an alternate form of the torsion bar end clamp.

Fig. 5 illustrates an alternate arrangement of like members wherein the same reference characters are used to designate those features heretofore described.

Figure 3:
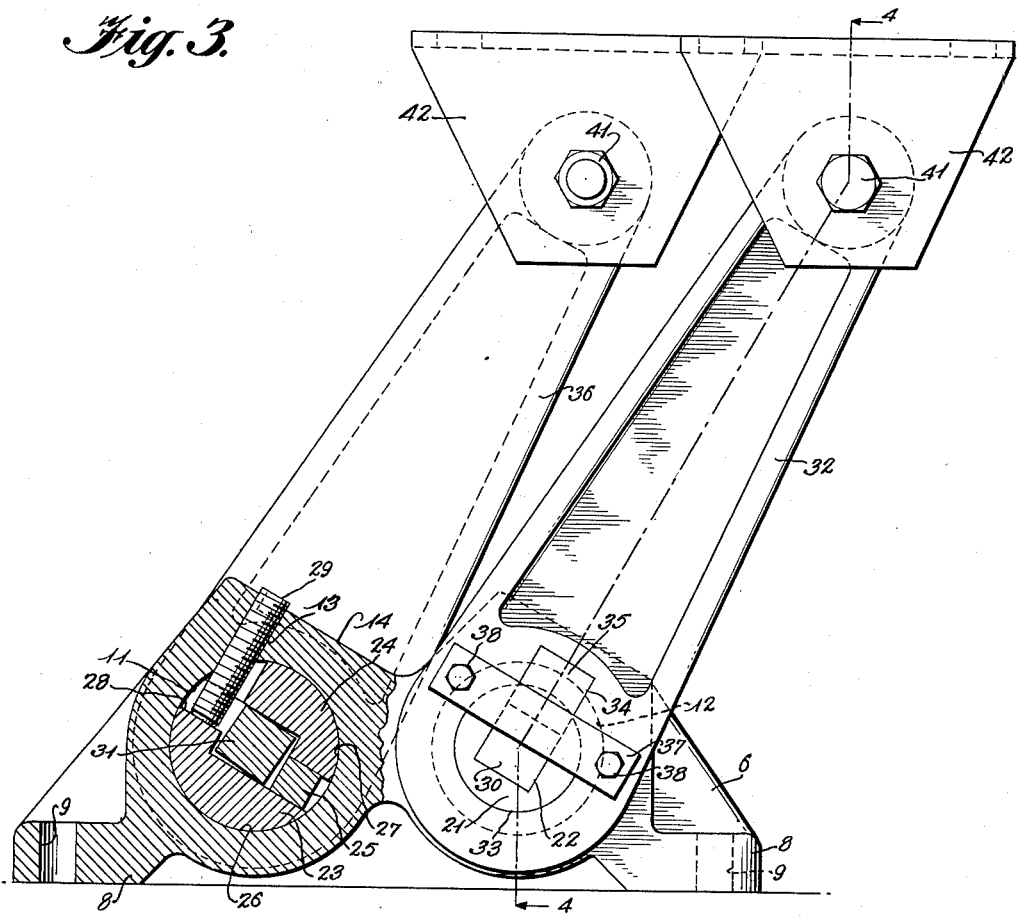

Referring now to Figs. 3 and 5, and assuming that the supporting arms 32 and 36 are connected to the body to be supported, the torsion bars 30 and 31 are placed in an initially twisted condition and clamped to their respective housings 7 and 6 in the following manner:

The upper end portions of supporting arms 32 and 36 are placed in the extreme forward position of the stroke. The set screws 29, which are approximately parallel axially with the center line of the supporting arms 32 and 36, are tightened to exert pressure on the surface 28 of the clamping shoe 23. This pressure causes the clamping shoes 23 and 24 and the spacer 25 to rotate about the axis of their associated opening 11 until the twisting of the torsion bar 30 or 31 causes a resisting force to be set up at diagonally opposite corners of the torsion bar 30 or 31 which will force the surfaces 26 and 27 of the clamping shoes 23 and 24 respectively into binding frictional contact with the opening 11. Continued twisting of the set screws 29 causes further twisting of the torsion bar 30 or 31 until the desired torsional stresses are established or until a limit is reached at which the self-energizing action of the clamping shoes 23 and 24 causes the frictional forces between the surfaces 26 and 27 of the clamping shoes 23 and 24 and the opening 11 to reach a point beyond which further tightening of the set screws 29 is impossible. This provision of a point of maximum stress avoids the possibility of an over-stressed condition resulting from improper field adjustment. When the torsion bars 30 and 31 are properly twisted, normal operation of the supported device will not oscillate the supporting arms 32 and 36 sufficiently to ever completely relieve the twisted condition in the torsion bars 30 and 31.

The neutral or normal position of the supporting arms 32 and 36 will usually lie at an angle of approximately 30 degrees from the vertical, but may vary from 25 to 35 degrees or more if circumstances require such a condition.

The set screws 29 are so located as to cause the twisting of both torsion bars 30 and 31 to be in the same direction relative to the supporting floor. The alternate arrangement shown in Fig. 5 provides for a reversal in the direction of twist by changing the location of the set screws 29 relative to the axis of the opening 11 and an end for end reversal of the clamping shoes 23 and 24 with the accompanying change in location of the spacer 25. Another arrangement can also be made in which a supporting arm assembly can be arranged to provide a reaction in one direction of one supporting arm 32 and a reaction in the other direction of the other supporting arm 36.

The initial twist in the torsion bars 30 and 31 imparts a reactor effect against the oscillation of the supporting arms 32 and 36 in the direction to further twist the torsion bars 30 and 31, and provides a simple adjustment for balancing the supporting effect of the supporting arms 32 and 36.

The alternate arrangement shown in Fig. 5 provides for similar operation with a reversal in the direction of the reactor effect.

What I claim is:

1. Apparatus for mounting the oscillatable body of a materials handling device, comprising housing means having an inner cylindrical surface, clamping means mounted in said housing means in frictional contact with the inner cylindrical surface and having a recess therein, a torsion bar having one end portion of non-circular cross-section positioned in loosely fitted relationship in said recess and rigidly connected to said housing means by relative rotation between said end portion and said clamping means, said end portion being supported by the clamping means out of contact with the housing means, means for rotating the clamping means and the associated end of the torsion bar relative to the housing means and to each other to twist the torsion bar and to bring about the clamping action of the clamping means, supporting means mounted in said housing means coaxially with said clamping means for supporting said torsion bar, for oscilating movements, at a point near its other end portion, and means for connecting the oscillatable end portion of said torsion bar to an oscillatable body.

2. Apparatus for mounting an oscillatable body, comprising housing means having an inner cylindrical surface, a plurality of clamping shoes, providing a space therebetween, mounted in said housing means and adapted to be placed in frictional contact with the inner cylindrical surface of said housing means, a torsion bar having an end portion initially loosely positioned within the space between said clamping shoes and supported by said shoes in but entirely out of contact with said housing means, said end portion being adapted to be rigidly connected to said housing means by the rotation of said clamping shoes relative to the housing means and the torsion bar for producing the clamping action by said shoes, means for adjustably rotating said clamping shoes relative to the housing and the torsion bar, a bushing mounted in said housing means coaxially with said clamping shoes for supporting said torsion bar, for oscillating movements, at a point near its other end portion, and means for connecting the oscillatable end portion of said torsion bar to an oscillatable body.

3. Apparatus for mounting an oscillatable body, comprising housing means having an inner cylindrical surface, a plurality of clamping shoes, providing a space therebetween, mounted in said housing means and adapted to be placed in frictional contact with the inner cylindrical surface of said housing means by the relative rotation of said clamping shoes therewith, a torsion bar having an end portion which has a cross section providing major and minor dimensions, said end portion being positioned within and initially loosely conforming in cross section with the space between said clamping shoes and supported by said shoes in but entirely out of contact with said housing means, and adapted to be rigidly connected to said housing means by the rotation of said clamping shoes relative to the torsion bar, means for adjustably rotating said clamping shoes to apply a twist to the associated end portion of said torsion bar to a point where the energy imparted to said torsion bar by the twisting thereof acts to force said clamping shoes into self-energizing frictional contact with the inner cylindrical surface of said housing means whereby further twisting of the torsion bar is prohibited, a bushing mounted in said housing means for supporting said torsion bar, for oscillating movements, at a point near its other end portion, and means for connecting the oscillatable end portion of said torsion bar to an oscillatable body.

4. Apparatus for mounting the oscillatable body of a materials handling device, comprising housing means having an inner cylindrical surface, a plurality of clamping shoes, providing a space therebetween, mounted in said housing means and adapted to be placed in frictional contact with the inner cylindrical surface of said housing means by the relative rotation of said clamping shoes therewith, a torsion bar having an end portion which has a cross section providing major and minor dimensions, said end portion being located in and initially loosely conforming in cross section with the space between said clamping shoes, and adapted to be rigidly connected to said housing means by the rotation of said clamping shoes relative to the torsion bar, means for adjustably rotating said clamping shoes to apply a twist to the associated end portion of said torsion bar to a point at which the self-energization of said clamping shoes acts to cause the frictional force between said clamping shoes and said inner cylindrical surface to reach a point preventing further rotation of said clamping shoes, a bushing mounted in said housing means for supporting said torsion bar, for oscillating movements, at a point near its other end portion, and an arm on the torsion bar for connecting the oscillatable end portion of said torsion bar to an oscillatable body.

5. Apparatus for mounting the oscillatable body of a materials handling device, comprising a housing having an inner cylindrical surface, a plurality of clamping shoes providing a space therebetween, mounted in said housing and adapted to be placed in frictional contact with the inner cylindrical surface of said housing by the relative rotation of said clamping shoes therewith, a torsion bar having an end portion which has a cross section providing major and minor dimensions, said end portion being located in and initially loosely conforming in cross section with the space between said clamping shoes, and adapted to be rigidly connected to said housing by the rotation of said clamping shoes relative to the torsion bar, means for adjustably rotating said clamping shoes, a bushing for supporting said torsion bar, for oscillating movements, at a point near its other end portion, a housing mounting said bushing coaxially with the space between said clamping shoes, and an arm on the torsion bar for connecting the oscillatable end portion of said torsion bar to an oscillatable body.

6. Apparatus for mounting the oscillatable body of a materials handling device, comprising a housing having an inner cylindrical surface, a pair of clamping shoes, providing a space therebetween, mounted in said housing and adapted to be placed in frictional contact with the inner cylindrical surface of said housing by the relative rotation of said clamping shoes therewith, a torsion bar having an end portion which has a cross section providing major and minor dimensions, said end portion being located in and initially loosely conforming in cross section with the space between said clamping shoes, and adapted to be rigidly connected to said housing by the rotation of said clamping shoes relative to the torsion bar, means for adjustably rotating said clamping shoes, a bushing for supporting said torsion bar, for oscillating movements, at a point near its other end portion, a housing mounting said bushing coaxially with the space between said clamping shoes, and an arm on the torsion bar for connecting the oscillatable end portion of said torsion bar to an oscillating body.

7. Apparatus for mounting the oscillatable body of a materials handling device, comprising housing means having an inner cylindrical surface, a plurality of clamping shoes, providing a space therebetween, mounted in said housing means and adapted to be placed in frictional contact with the inner cylindrical surface of said housing means by the relative rotation of said clamping shoes therewith, a torsion bar having an end portion which has a cross section providing major and minor dimensions, said end portion being located in and initially loosely conforming in cross section with the space between said clamping shoes, and adapted to be rigidly connected to said housing means by the rotation of said clamping shoes relative to the torsion bar, means for adjustably rotationg said clamping shoes to apply a sufficient twist to the associated end portion of said torsion bar so that said torsion bar retains the same direction of twist while being oscillated and whereby the energy imparted to said torsion bar by the twisting thereof acts to force said clamping shoes into binding contact with the inner cylindrical surface of said housing means, a resilient bushing mounted in said housing means for supporting said torsion bar, for oscillating movements, at a point near its other end portion, and an arm on the torsion bar for connecting the oscillatable end portion of said torsion bar to an oscillatable body.

8. In a device of the type described, a housing, clamping means, providing an opening, rotatably mounted in said housing, a torsion bar having one end portion adapted to be held against rotation and the other end portion initially loosely positioned in the opening provided by said clamping means and supported by said clamping means out of contact with said housing, and means for rotating said clamping means to twist said torsion bar and to bring said clamping means into clamped relation with said housing and said torsion bar.

9. In a device of the type described, a housing having an inner cylindrical surface, a plurality of clamping shoes, providing a space therebetween, rotatably mounted in said housing, a torsion bar having one end portion being adapted to be held against rotation and the other end portion initially loosely positioned in the space between said clamping shoes and supported by the latter out of contact with said housing, and means for rotating said clamping shoes to twist said torsion bar and to bring said clamping means into clamped relation with said housing and said torsion bar.

10. In a device of the type described, a housing having an inner cylindrical surface, a plurality of clamping shoes, providing a space therebetween, mounted in said housing and adapted to be placed in frictional contact with the inner cylindrical surface of said housing, a torsion bar having one end portion adapted to be held against rotation and the other end portion initially loosely positioned in the space between said clamping shoes and supported by the latter out of contact with said housing, said last mentioned end portion being adapted to be rigidly connected to said housing by the rotation of said clamping shoes relative to the housing means and the torsion bar for producing the clamping action by said shoes, and means for adjustably rotating said clamping shoes relative to the housing and the torsion bar.

11. In a device of the type described, a housing having an inner cylindrical surface, a pair of clamping shoes, providing a space therebetween, mounted in said housing and adapted to be placed in frictional contact with the inner cylindrical surface of said housing by the relative rotation of said clamping shoes therewith, a torsion bar having an end portion which has a cross section providing major and minor dimensions, said end portion being located in and initially loosely conforming in cross section with the space between said clamping shoes, and adapted to be rigidly connected to said housing by the rotation of said clamping shoes relative to the torsion bar, and means for adjustably rotating said clamping shoes to apply a twist to the associated end portion of said torsion bar, the energy imparted to said torsion bar by the twisting thereof acting on said clamping shoes to force the shoes into binding contact with the inner cylindrical surface of said housing.

12. Apparatus for mounting the oscillatable body of a materials handling device, comprising two housings, a connecting device rotatably mounted in each one of said housings, a supporting device mounted in each one of said housings coaxially with the connecting device mounted in the other housing, a pair of substantially parallel torsion bars each one of which is connected at one of its end portions to one of said housings by engagement of said end portion with the associated connecting device but out of contact with the housing and supported at a point near its other end portion, for oscillating movements, by the coaxially mounted supporting device, means for rotating said connecting means relative to the housings to twist the torsion bars and for preventing reverse rotation of the connecting means relative to the housings and means for connecting the oscillatable end portions of said torsion bars to opposite sides of an oscillatable body.

13. Apparatus for mounting the oscillatable body of a materials handling device, comprising two housings, each one of said housings having two substantially axially parallel openings formed with cylindrically shaped inner surfaces, a plurality of clamping shoes, providing a space therebetween, mounted in one of the openings of each one of said housings and adapted to be placed in frictional contact with its inner cylindrical surface by the relative rotation of said clamping shoes therewith, a bushing mounted in the remaining opening of each one of said housings coaxially with the clamping shoes mounted in the other housing, a pair of substantially parallel torsion bars each one of which has an end portion having a cross section provided with major and minor dimensions received in and initially loosely conforming in cross section with the space of the clamping shoes of one of said housings and adapted to be rigidly connected to said housing by the rotation of said clamping shoes relative to the torsion bar and supported at a point near its other end portion, for oscillating movements, by the coaxially mounted bushing of the other housing, means for adjustably rotating the clamping shoes of both housings, and means for connecting the oscillatable end portions of said torsion bars to opposite sides of an oscillatable body.

14. Apparatus for mounting the oscillatable body of a materials handling device, comprising two housings each one of said housings having two substantially axially parallel openings formed with cylindrically shaped inner surfaces, a pair of clamping shoes, providing a space therebetween, mounted in one of the openings of each one of said housings and adapted to be placed in frictional contact with its inner cylindrical surface, a bushing mounted in the remaining opening of each one of said housings coaxially with the clamping shoes mounted in the other housing, a pair of substantially parallel torsion bars each one of which has an end portion having a cross section provided with major and minor dimensions received in and initially loosely conforming in cross section with the space of the clamping shoes of one of said housings and adapted to be rigidly connected to said housing by the rotation of said clamping shoes relative to the torsion bar and supported at a point near its other end portion, for oscillating movements, by the coaxially mounted bushing of the other housing, means for adjustably rotating the clamping shoes of both housings to apply a twist to the associated end portions of said torsion bars whereby the energy imparted to said torsion bars by the twisting thereof acts to force said clamping shoes into binding contact with the associated inner cylindrical surfaces of said housings, and an arm on each of said torsion bars for connecting the oscillatable end portions of said torsion bars to an oscillatable body.

15. Apparatus for mounting the oscillatable body of a materials handling device, comprising housing means having an inner cylindrical surface, radially expandable means rotatably mounted in said housing means with the outer surface of the expandable means adjacent the inner cylindrical surface, a torsion bar having one of its end portions positioned within said expandable means and connected to said housig means by radial expansion of said expandable means into binding friction engagement with the cylindrical surface, means for rotating said expandable means and the associated end portion of the torsion bar relative to the housing means for twisting the torsion bar to effect radial expansion of said expandable means into binding frictional engagement with the cylindrical surface and for preventing reverse rotation of the expandable means and the associated end portion of the torsion bar relative to the housing means, means mounted in said housing means coaxially with said expandable means for supporting said torsion bar, for oscillating movements, at a point near its other end portion, and means for connecting the oscillatable end portion of said torsion bar to an oscillatable body.

16. Apparatus for mounting the oscillatable body of a materials handling device, comprising a housing having an inner cylindrical surface, radially expandable means rotatably mounted in said housing, with the outer surface of the expandable means adjacent the inner cylindrical surface, a torsion bar having one of its end portions positioned within said expandable means and connected to said housing by radial expansion of said expandable means into binding frictional engagement with said cylindrical surface, means for rotating said expandable means and the associated end portion of the torsion bar relative to the housing for twisting the torsion bar to effect radial expansion of said expandable means into binding frictional engagement with the cylindrical surface and for preventing reverse rotation of the expandable means and the associated end portion of the torsion bar relative to the housing, means for supporting said torsion bar, for oscillating movements, at a point near its other end portion, a second housing mounting said supporting means coaxially with said expandable means, and an arm on the torsion bar for connecting the oscillatable end portion of said torsion bar to an oscillating body.

17. Apparatus for mounting the oscillatable body of a materials handling device, comprising housing means having an inner cylindrical surface, radially expandable means rotatably mounted in said housing means with the outer surface of the expandable means adjacent the inner cylindrical surface, a torsion bar having one of its end portions positioned within said expandable means and connected to said housing means by radial expansion of said expandable means into binding frictional engagement with the cylindrical surface, means threadedly associated with said housing means engageable with said expandable means for rotating the latter relative to the housing means to twist the torsion bar and effect radial expansion of said expandable means into binding frictional engagement with the cylindrical surface and for preventing reverse rotation of the expandable means relative to the housing means, means mounted in said housing means coaxially with said expandable means for supporting said torsion bar, for oscillating movements, at a point near its other end portion, and means for connecting the oscillatable end portion of said torsion bar to an oscillating body.

18. Apparatus for mounting the oscillatable body of a materials handling device, comprising a housing having an inner cylindrical surface, radially expandable means rotatably mounted in said housing with the outer surface of the expandable means adjacent the inner cylindrical surface, a torsion bar having one of its end portions positioned within said expandable means and connected to said housing by radial expansion of said expandable means into binding frictional engagement with the cylindrical surface, a set screw associated with said housing engageable with said expandable means for rotating the latter relative to the housing to twist the torsion bar and effect radial expansion of said expandable means into binding frictional engagement with the cylindrical surface, and for preventing reverse rotation of the expandable means relative to the housing, means for supporting said torsion bar, for oscillating movements, at a point near its other end portion, a second housing mounting said supporting means coaxially with said expandable means, and an arm on the torsion bar for connecting the oscillatable end portion of said torsion bar to an oscillating body.

ALBERT MUSSCHOOT.

REFERENCES CITED

The following references are of record in the file of this patent:

UNITED STATES PATENTS

| Number | Name | Date |
| --- | --- | --- |
| 165,641 | Whitney | July 13, 1875 |
| 376,104 | Myers | Jan. 10, 1888 |
| 775,764 | Pugh | Nov. 22, 1904 |
| 792,733 | Schoenherr | June 20, 1905 |
| 2,082,509 | Rabe | June 1, 1937 |
| 2,103,590 | Lefevre | Dec. 28, 1937 |
| 2,164,096 | Tjaarda | June 27, 1939 |
| 2,175,562 | Frohlich | Oct. 10, 1939 |